US010185575B2

(12) United States Patent
Lee

(10) Patent No.: US 10,185,575 B2
(45) Date of Patent: Jan. 22, 2019

(54) COMPUTING DEVICE FOR OPERATING A MACHINE SESSION WITH PERSISTENT READ CACHE AND NON-PERSISTENT WRITE CACHE AND RELATED METHODS

(71) Applicant: Citrix Systems. Inc., Burlington, MA (US)

(72) Inventor: Moso Lee, Nashua, NH (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 147 days.

(21) Appl. No.: 15/159,900

(22) Filed: May 20, 2016

(65) Prior Publication Data

US 2017/0337070 A1  Nov. 23, 2017

(51) Int. Cl.
*G06F 15/177* (2006.01)
*G06F 9/00* (2006.01)
*G06F 9/4401* (2018.01)
*G06F 12/0868* (2016.01)
(Continued)

(52) U.S. Cl.
CPC .......... *G06F 9/4416* (2013.01); *G06F 9/4406* (2013.01); *G06F 12/0868* (2013.01); *H04L 67/025* (2013.01); *H04L 67/04* (2013.01); *H04L 67/06* (2013.01); *H04L 67/10* (2013.01); *H04L 67/1095* (2013.01); *H04L 67/14* (2013.01); *H04L 67/2842* (2013.01); *H04L 67/2852* (2013.01); *H04L 67/42* (2013.01);
(Continued)

(58) Field of Classification Search
CPC .............. G06F 9/4416; G06F 12/0868; G06F 2212/154; G06F 2212/224; G06F 2212/60; H04L 67/06
See application file for complete search history.

(56) References Cited

U.S. PATENT DOCUMENTS 6,151,674 A * 11/2000 Takatani .................. G06F 8/61
709/222
6,675,382 B1 * 1/2004 Foster ...................... G06F 8/61
707/999.001

(Continued)

OTHER PUBLICATIONS

"Understanding write cache in provisioning services server" http://support.citrix.com/article/ctx119469: created Mar. 26, 2014; modified Sep. 9, 2015; retrieved from internet May 10, 2016; pp. 3.

*Primary Examiner* — Xuxing Chen
(74) *Attorney, Agent, or Firm* — Allen, Dyer, Doppelt + Gilchrist, PA

(57) ABSTRACT

A computing device may include at least one memory and a processor cooperating therewith to receive a streaming base disk image from a base disk on a provisioning server over a network upon booting up the computing device, and operate a machine session on the computing device from the streaming base disk image. Furthermore, while the machine session operates on the computing device from the streaming base disk image, the processor may further cooperate with the at least one memory to download and store the base disk image over the network from the provisioning server to a persistent read cache in the at least one memory that persists on the client device after rebooting, and store modifications to the streaming base disk image in a non-persistent write cache in the at least one memory that does not persist on the client device after rebooting.

15 Claims, 10 Drawing Sheets

(51) Int. Cl.
*H04L 29/08* (2006.01)
*H04L 29/06* (2006.01)

(52) U.S. Cl.
CPC .. *G06F 2212/154* (2013.01); *G06F 2212/224* (2013.01); *G06F 2212/60* (2013.01)

(56) References Cited

U.S. PATENT DOCUMENTS

| | | | | |
|---|---|---|---|---|
| 6,782,448 | B2* | 8/2004 | Goodman | G06F 8/67 |
| | | | | 360/12 |
| 8,996,667 | B2* | 3/2015 | Clerc | G06F 9/4416 |
| | | | | 709/222 |
| 9,176,744 | B2 | 11/2015 | Lee | |
| 2009/0164840 | A1* | 6/2009 | Nagai | G06F 11/1435 |
| | | | | 714/6.12 |
| 2012/0297181 | A1 | 11/2012 | Lee | |
| 2015/0160877 | A1 | 6/2015 | Larkin et al. | |

* cited by examiner

COMPUTING DEVICE FOR OPERATING A MACHINE SESSION WITH PERSISTENT READ CACHE AND NON-PERSISTENT WRITE CACHE AND RELATED METHODS

TECHNICAL FIELD

This disclosure relates to computer networks and remote computing, and more particularly to implementing a provisioned machine on a client endpoint device.

BACKGROUND

In an environment for centralized management of desktops, multiple client machines may receive access to or execute a computing environment based on copies of a single "golden master" desktop disk image. A machine disk image or desktop disk image may be an image of an operating system (OS), and may include sets of applications and customizations representing a working environment for a user. In some environments, a machine image includes files used to execute a virtual machine (VM) that then executes an operating system or other user applications. In other environments, a desktop image includes files used to execute an operating system or other user application, and either a physical machine or a virtual machine may execute the desktop image. An image of a machine or desktop may be generally referred to as a base disk image.

Generally speaking, two approaches are used for machine deployment. The first approach is machine streaming by utilizing network boot technology to stream an operating system and workload on demand over a network. While the approach provides "instant gratification" to endpoints without a significant wait time, it requires that the machine maintains constant network connection.

The second approach is machine image cloning, such as by utilizing an xcopy operation to copy a machine image to each endpoint. Once the image is deployed to each endpoint, it is a distributed computing model. While this allows the endpoint to perform offline computing after image deployment, it also requires a relatively long down time for the initial image transfer.

SUMMARY

A computing device may include at least one memory and a processor cooperating therewith to receive a streaming base disk image from a base disk on a provisioning server over a network upon booting up the computing device, and operate a machine session on the computing device from the streaming base disk image. Furthermore, while the machine session operates on the computing device from the streaming base disk image, the processor may further cooperate with the at least one memory to download and store the base disk image over the network from the provisioning server to a persistent read cache in the at least one memory that persists on the client device after rebooting, and store modifications to the streaming base disk image in a non-persistent write cache in the at least one memory that does not persist on the client device after rebooting. This may advantageously allow the computing device to benefit from rapid machine provisioning via a network boot, while also having the ability to enter an offline capable state based upon the persistent read cache, as will be discussed further below.

More particularly, the processor may determine if the base disk image in the persistent read cache is synchronized with the base disk on the provisioning server during a next boot up of the computing device. If so, the processor may operate the machine session from the synchronized base disk image in the persistent read cache. If not, the processor may receive the streaming base disk image from the base disk on the provisioning server and operate the machine session from both the streaming base disk image and the unsynchronized base disk image in the persistent read cache. Moreover, the processor may further resume downloading and storing the base disk image from the provisioning server to the persistent read cache after the next boot up. Furthermore, when the base disk image in the persistent read cache is synchronized with the base disk on the provisioning server, the processor may operate the machine session in an offline mode after the next boot up from the synchronized base disk image in the persistent read cache based upon detecting a boot device.

The processor may download and store the base disk image to the persistent read cache in the background while the machine session operates on the computing device. Furthermore, the processor may also be configured to determine a size of the base disk on the provisioning server before downloading and storing the base disk image to the persistent read cache. By way of example, the at least one memory may comprise a hard disk and a random access memory (RAM), and the persistent read cache may be in the hard disk, and the non-persistent write cache may be in at least one of the RAM and the hard disk.

A related method is also provided for using a computing device, such as the one described briefly above. The method may include receiving a streaming base disk image from a base disk on a provisioning server over a network upon booting up the computing device, and operating a machine session on the computing device from the streaming base disk image. Furthermore, while the machine session operates on the computing device from the streaming base disk image, the method may also include downloading and storing the base disk image over the network from the provisioning server to a persistent read cache that persists on the client device after rebooting, and storing modifications to the streaming base disk image in a non-persistent write cache that does not persist on the client device after rebooting.

A related non-transitory computer-readable medium for a computing device, such as the one described briefly above, is also provided. The non-transitory computer-readable medium may have computer-executable instructions for causing the computing device to perform steps including receiving a streaming base disk image from a base disk on a provisioning server over a network upon booting up the computing device, and operating a machine session on the computing device from the streaming base disk image. Moreover, while the machine session operates on the computing device from the streaming base disk image, the steps may further include downloading and storing the base disk image over the network from the provisioning server to a persistent read cache that persists on the client device after rebooting, and storing modifications to the streaming base disk image in a non-persistent write cache that does not persist on the client device after rebooting.

DETAILED DESCRIPTION OF THE EMBODIMENTS

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout.

Figure 1:
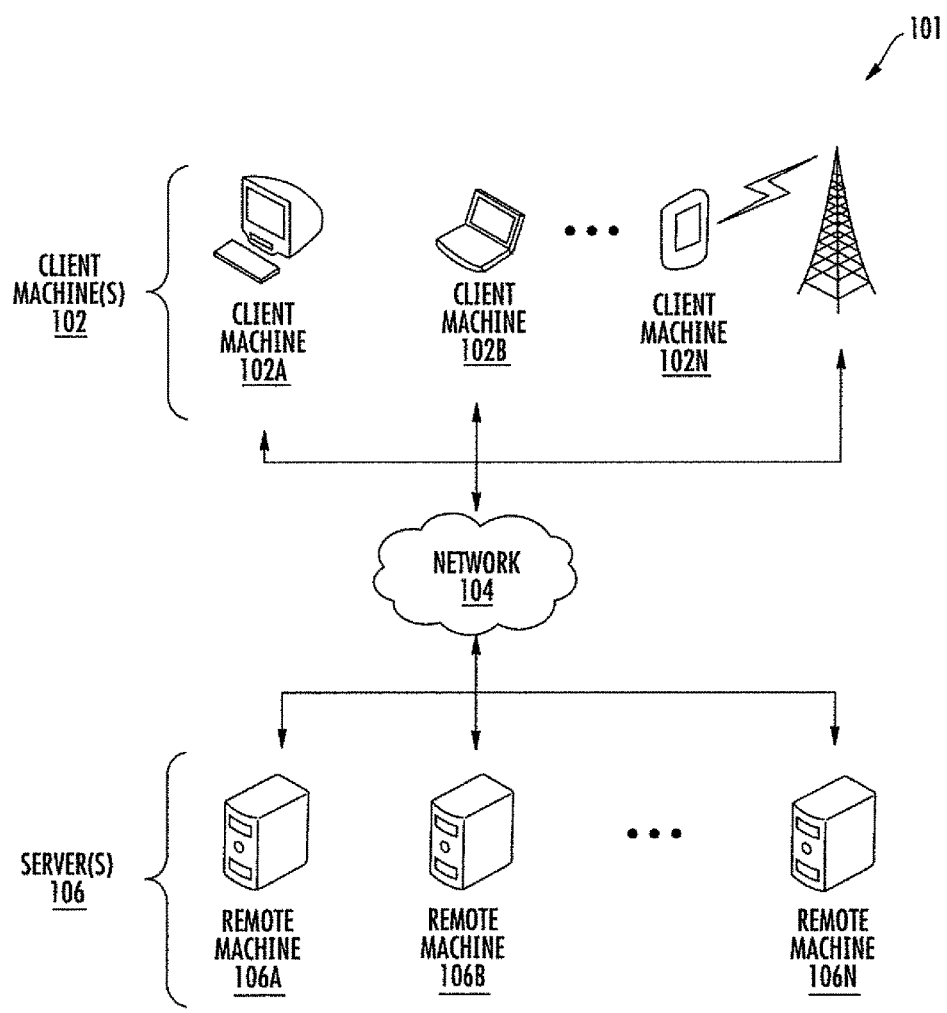
FIG. 1 illustrates an embodiment of a network environment that provides remote access to computing devices that may execute application programs.
Figure 2:
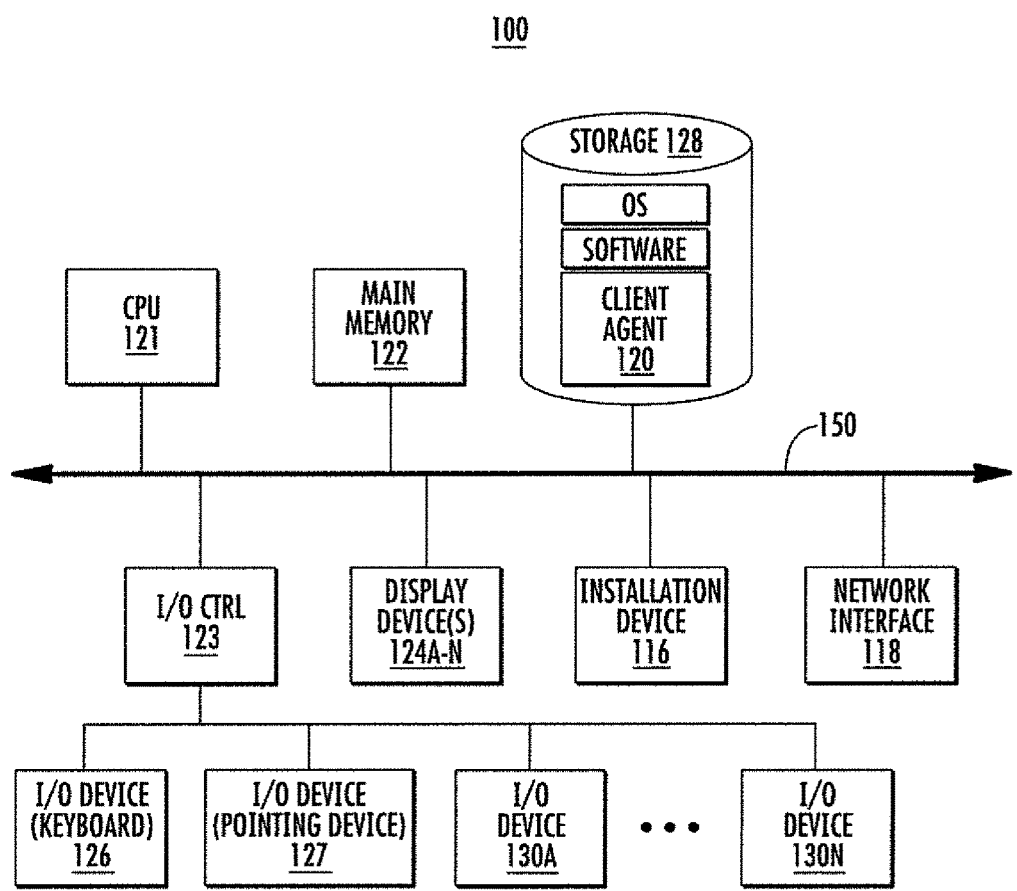
FIG. 2 and FIG. 3 illustrate block diagrams that depict embodiments of computing devices.
Figure 3:
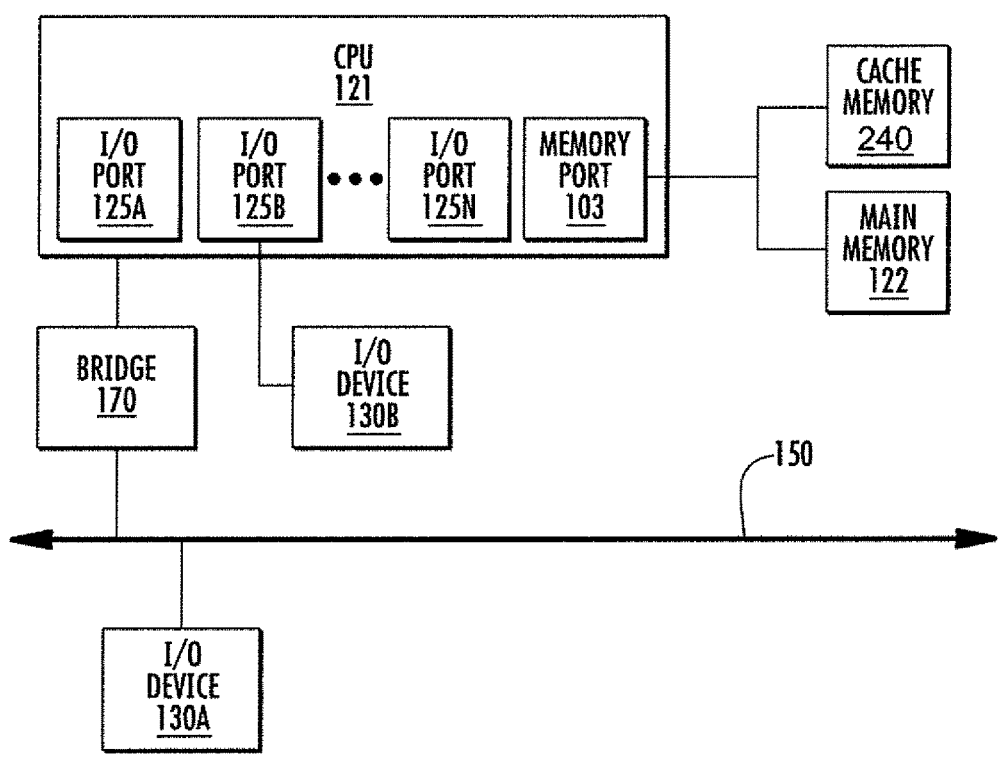

Referring initially to FIGS. 1-3, a non-limiting illustrative network environment and computing environment which may be useful for practicing embodiments described herein is first described. FIG. 1 illustrates one embodiment of a computing environment 101 that includes one or more client machines 102A-102N in communication with one or more remote machines 106A-106N via one or more networks 104. One or more client machines 102A-102N may be generally referred to herein client machine(s) 102, local machine(s) 102, client(s) 102, client node(s) 102, client computer(s) 102, client device(s)102, endpoint(s) 102, endpoint node(s) 102, computing device(s) 102 or combinations thereof. One or more remote machines 106A-106N may be generally referred to herein as server(s) 106 or server farm 106. In some embodiments, a client machine 102 may have the capacity to function as both a client node seeking access to resources provided by a server 106 and as a server 106 providing access to hosted resources for other client machines 102A-102N.

In one embodiment, the client machine 102 may be a virtual machine. The virtual machine may be managed by, for example, a hypervisor, a virtual machine manager (VMM), or any other hardware virtualization technique.

In some embodiments, the client machine 102 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments include a client device 102 that displays application output generated by an application remotely executing on a server 106 or other remotely located machine. In these embodiments, the client device 102 may display the application output in an application window, a browser, or other output window. In one embodiment, the application may be a desktop, while in other embodiments the application may be an application that generates a desktop.

In some embodiments, a server 106 may execute a remote presentation client or other client or program that uses a thin-client or remote-display protocol to capture display output generated by an application executing on a server 106 and transmits the application display output to a remote client 102.

In some embodiments, the computing environment may include more than one remote machine 106A-106N logically grouped together into a server farm 106. The server farm 106 may include servers 106 that are geographically dispersed and logically grouped together in a server farm 106, or servers 106 that are located proximate to each other and logically grouped together. The logical group of remote machines 106A-106N may be referred to as a server farm 106. In some instances, the remote machines 106A-N of each server farm 106 may be geographically dispersed. Geographically dispersed servers 106A-106N within a server farm 106 may, in some embodiments, communicate using a wide area network (WAN), a metropolitan area network (MAN), or a local area network (LAN), where different geographic regions may be characterized as: different continents; different regions of a continent; different countries; different states; different cities; different campuses; different rooms; or any combination of geographical locations. In some embodiments the server farm 106 may be administered as a single entity, while in other embodiments the server farm 106 may include multiple server farms 106.

In some embodiments, a server farm 106 may include servers 106 that execute a substantially similar type of operating system platform. In other embodiments, the remote machines 106 within each server farm 106 may be heterogeneous. For example, the server farm 106 may include a first group of servers 106 that execute a first type of operating system platform, and a second group of servers 106 that execute a second type of operating system platform. The server farm 106, in other embodiments, may include servers 106 that execute different types of operating system platforms.

A remote machine 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; an application server or as a master application server; a server 106 executing an active directory; or a server 106 executing an application acceleration program that provides firewall functionality, application functionality, or load balancing functionality. In some embodiments, a server 106 may be a RADIUS server that includes a remote authentication dial-in user service. In still other embodiments, a remote machine 106is a blade server. In yet other embodiments, a remote machine 106 executes a virtual machine providing, to a user or client computer 102, access to a computing environment.

Some embodiments include a first server 106A that receives requests from a client machine 102, forwards the request to a second server 106B, and responds to the request generated by the client machine 102 with a response from the second server 106B. The first server 106A may acquire an enumeration of applications available to the client machine 102 and well as address information associated with an application server 106 hosting an application identified within the enumeration of applications. The first server 106A may then present a response to the client's request using a web interface, and communicate directly with the client 102 to provide the client 102 with access to an identified application.

The remote machine 106 or server farm 106 may, in some embodiments, execute any one of the following applications: a thin-client application using a thin-client protocol to transmit application display data to a client; or a remote display presentation application. Another embodiment includes a server 106 that is an application server such as: an email server that provides email services; a web or Internet server; a desktop sharing server; a collaboration server; or any other type of application server. Still other embodiments include a server 106 that executes a hosted server application, such as a remote meeting or desktop sharing application.

In some embodiments, a remote machine 106 may execute an application on behalf of a user of a client 102. In other embodiments, a remote machine 106 executes a virtual machine, which provides an execution session within which applications execute on behalf of a user or a client 102. In one of these embodiments, the execution session is a hosted desktop session. In another of these embodiments, the execution session provides access to a computing environment, which may comprise one or more of: an application, a plurality of applications, a desktop application, and a desktop session in which one or more applications may execute.

A client machine 102 may be, for example, a client node that seeks access to resources provided by a server 106. In other embodiments, the server 106 may provide clients 102 or client nodes with access to hosted resources. The server 106, in some embodiments, functions as a master node such that it communicates with one or more clients 102 or servers 106. In some embodiments, the master node may identify and provide address information associated with a server 106 hosting a requested application, to one or more clients 102 or servers 106. In still other embodiments, the master node may be a server farm 106, a client 102, a cluster of client nodes 102, or an appliance.

In some embodiments, a client 102 may communicate directly with one of the remote machines 106 in a server farm 106. In another embodiment, the client 102 executes a program neighborhood application to communicate with a remote machine 106 in a server farm 106. In still another embodiment, the remote machine 106 provides the functionality of a master node. In some embodiments, the client 102 communicates with the remote machine 106 in the server farm 106 through a network 104. Over the network 104, the client 102 may, for example, request execution of various applications hosted by the remote machines 106A-106N in the server farm 106 and receive output of the results of the application execution for display. In some embodiments, only the master node provides the functionality required to identify and provide address information associated with a remote machine 106B hosting a requested application.

In one embodiment, the remote machine 106 provides the functionality of a web server. In another embodiment, the remote machine 106A receives requests from the client 102, forwards the requests to a second remote machine 106B and responds to the request by the client 102 with a response to the request from the remote machine 106B. In still another embodiment, the remote machine 106B acquires an enumeration of applications available to the client 102 and address information associated with a remote machine 106B hosting an application identified by the enumeration of applications. In yet another embodiment, the remote machine 106 presents the response to the request to the client 102 using a web interface. In one embodiment, the client 102 communicates directly with the remote machine 106 to access the identified application. In another embodiment, the client 102 receives output data, such as display data, generated by an execution of the identified application on the remote machine 106.

One or more client machines 102, one or more servers 106, or both may transmit data over a one or more networks 104 installed between machines and appliances within the computing environment 101. The network 104 may comprise one or more sub-networks, and may be installed between any combination of the clients 102, servers 106, computing machines and appliances included within the computing environment 101. In some embodiments, the network 104 may be: a local-area network (LAN); a metropolitan area network (MAN); a wide area network (WAN); a primary network 104 comprised of multiple sub-networks 104 located between the client machines 102 and the servers 106; a primary public network 104 with a private sub-network 104; a primary private network 104 with a public sub-network 104; or a primary private network 104 with a private sub-network 104. Still further embodiments include a network 104 that may be any of the following network types: a point to point network; a broadcast network; a telecommunications network; a data communication network; a computer network; an Asynchronous Transfer Mode (ATM) network; a Synchronous Optical Network (SONET) network; a Synchronous Digital Hierarchy (SDH) network; a wireless network; a wireline network; or a network 104 that includes a wireless link where the wireless link may be an infrared channel or satellite band. The network topology of the network 104 may differ within different embodiments. Possible network topologies include: a bus network topology; a star network topology; a ring network topology; a repeater-based network topology; or a tiered-star network topology. Additional embodiments may include a network 104 of mobile telephone networks that use a protocol to communicate among mobile devices, where the protocol may be any one of the following: Advanced Mobile Phone System (AMPS); Time Division Multiple Access (TDMA); Code Division Multiple Access (CDMA); Global System for Mobile Communications (GSM); General Packet Radio Service (GPRS); Universal Mobile Telecommunications System (UMTS); Evolution-Data Optimized (EV-DO); Long Term Evolution (LTE); or any other protocol able to transmit data among mobile devices like 802.11, Bluetooth, and Near Field Communication.

Although FIG. 1 shows a network 104 between the client machines 102 and remote machines 106, there may multiple networks 104 between the clients 102 and the remote machines 106. In one of these embodiments, a network 104' may be a private network and a network 104 may be a public network. In another of these embodiments, a network 104 may be a private network and a network 104' a public network. In still another embodiment, networks 104 and 104' may both be private networks. Additional networks, such as network 104', are not shown in FIG. 1 to avoid overcomplicating the drawing.

FIG. 2 and FIG. 3 depict block diagrams of a computing device 100 useful for practicing an embodiment of the client 102 or a remote machine 106. As shown in FIG. 1B and FIG. 1C, each computing device 100 includes a central processing unit 121, and a main memory unit 122. FIG. 2 depicts an embodiment of a computing device 100 in which the processor 121 communicates with main memory 122 via a system bus 150. FIG. 3 depicts an embodiment of a computing device 100 in which the processor 121 communicates directly with main memory 122 and cache memory 240 via a memory port 103.

FIG. 2 illustrates an embodiment of a computing device 100, where the client machine 102 and server 106 illustrated in FIG. 1 may be deployed as and/or executed on any embodiment of the computing device 100 illustrated and described herein. Included within the computing device 100 is a system bus 150 that communicates with the following components: a central processing unit 121; a main memory 122; storage memory 128; an input/output (I/O) controller 123; display devices 124A-124N; an installation device 116; and a network interface 118. In one embodiment, the storage memory 128 includes: an operating system, software routines, and a client agent 120. The I/O controller 123, in some embodiments, is further connected to a keyboard 126, and a pointing device 127. Other embodiments may include an I/O controller 123 connected to more than one input/output device 130A-130N.

FIG. 3 illustrates another embodiment of a computing device 100, where the client machine 102 and server 106 illustrated in FIG. 1 may be deployed as and/or executed on any embodiment of the computing device 100 illustrated and described herein. Included within the computing device 100 is a system bus 150 that communicates with the following components: a bridge 170, and a first I/O device 130A. In another embodiment, the bridge 170 is in further communication with the main central processing unit 121, where the central processing unit 121 may further communicate with a second I/O device 130B, a main memory 122, and a cache memory 240. Included within the central processing unit 121, are I/O ports 125A-N, a memory port 103, and a main processor 121.

Embodiments of the computing machine 100 may include a central processing unit 121 characterized by any one of the following component configurations: logic circuits that respond to and process instructions fetched from the main memory unit 122; a microprocessor unit, a microprocessor, a microcontroller, a central processing unit with a single processing core, a central processing unit with two processing cores, a central processing unit with more than one processing core, a programmable logic device, or any other suitable combination of logical circuits.

While FIG. 3 illustrates a computing device 100 that includes a single central processing unit 121, in some embodiments the computing device 100 may include one or more processing units 121. In these embodiments, the computing device 100 may store and execute firmware or other executable instructions that, when executed, direct the one or more processing units 121 to simultaneously execute instructions or to simultaneously execute instructions on a single piece of data. In other embodiments, the computing device 100 may store and execute firmware or other executable instructions that, when executed, direct the one or more processing units to each execute a section of a group of instructions. For example, each processing unit 121 may be instructed to execute a portion of a program or a particular module within a program.

In some embodiments, the processing unit 121 may include one or more processing cores. For example, the processing unit 121 may have two cores, four cores, eight cores, etc. In one embodiment, the processing unit 121 may comprise one or more parallel processing cores. The processing cores of the processing unit 121 may in some embodiments access available memory as a global address space, or in other embodiments, memory within the computing device 100 may be segmented and assigned to a particular core within the processing unit 121. In one embodiment, the one or more processing cores or processors in the computing device 100 may each access local memory. In still another embodiment, memory within the computing device 100 may be shared amongst one or more processors or processing cores, while other memory may be accessed by particular processors or subsets of processors. In embodiments where the computing device 100 includes more than one processing unit, the multiple processing units may be included in a single integrated circuit (IC). These multiple processors, in some embodiments, may be linked together by an internal high speed bus, which may be referred to as an element interconnect bus.

In embodiments where the computing device 100 includes one or more processing units 121, or a processing unit 121 including one or more processing cores, the processors may execute a single instruction simultaneously on multiple pieces of data (SIMD), or in other embodiments may execute multiple instructions simultaneously on multiple pieces of data (MIMD). In some embodiments, the computing device 100 may include any number of SIMD and MIMD processors.

The computing device 100, in some embodiments, may include a graphics processor or a graphics-processing unit. The graphics processing unit may include any combination of software and hardware, and may further input graphics data and graphics instructions, render a graphic from the inputted data and instructions, and output the rendered graphic. In some embodiments, the graphics processing unit may be included within the processing unit 121. In other embodiments, the computing device 100 may include one or more processing units 121, where at least one processing unit 121 is dedicated to processing and rendering graphics.

One embodiment of the computing machine 100 includes a central processing unit 121 that communicates with cache memory 140 via a secondary bus also known as a backside bus, while another embodiment of the computing machine 100 includes a central processing unit 121 that communicates with cache memory via the system bus 150. The local system bus 150 may, in some embodiments, also be used by the central processing unit to communicate with more than one type of I/O device 130A-130N. In some embodiments, the local system bus 150 may be any one of the following types of buses: a Video Electronics Standards Association Local (VL) bus; an Industry Standard Architecture (ISA) bus; an Extended ISA (EISA) bus; a MicroChannel Architecture (MCA) bus; a Peripheral Component Interconnect (PCI) bus; a PCI-Extended (PCI-X) bus; a PCI-Express (PCIe) bus; or an Accelerated Graphics Port (AGP) bus. Other embodiments of the computing machine 100 include an I/O device 130A-130N that is a video display 124 that communicates with the central processing unit 121. Still other versions of the computing machine 100 include a processor 121 connected to an I/O device 130A-130N via any suitable connection, such as: HyperTransport, Rapid I/O, or InfiniBand. Further embodiments of the computing machine 100 include a processor 121 that communicates with one I/O device 130A using a local interconnect bus and a second I/O device 130B using a direct connection.

The computing device 100, in some embodiments, includes a main memory unit 122 and cache memory 240. The cache memory 240 and main memory unit 122 may, and in some embodiments may be any one of the following types of memory: Static Random Access Memory (SRAM), Burst SRAM or SynchBurst SRAM (BSRAM); Dynamic Random Access Memory (DRAM); Fast Page Mode DRAM (FPM DRAM); Enhanced DRAM (EDRAM), Extended Data Output RAM (EDO RAM); Extended Data Output DRAM (EDO DRAM); Burst EDO DRAM (BEDO DRAM); synchronous DRAM (SDRAM); Joint Electron Devices Engineering Council (JEDEC) SRAM; PC100 SDRAM; Double Data Rate SDRAM (DDR SDRAM); Enhanced SDRAM (ESDRAM); SyncLink DRAM (SLDRAM); Ferroelectric RAM (FRAM); memristor based memory; or any other type of memory. Further embodiments include a central processing unit 121 that may access the main memory 122 via: a system bus 150; a memory port 103; or any other connection, bus or port that allows the processor 121 to access memory 122.

One embodiment of the computing device 100 provides support for any one of the following installation devices 116: a CD-ROM drive, a CD-R/RW drive, a DVD-ROM drive, tape drives of various formats, a universal serial bus (USB) device, Secure Digital card, Preboot Execution Environment (PXE) firmware, a bootable medium, a bootable CD, a hard-drive or any other device suitable for installing applications or software. Applications may in some embodiments include a client agent 120, or any portion of a client agent 120. The computing device 100 may further include a storage device 128 that may be either one or more hard disk drives, or one or more redundant arrays of independent disks; where the storage device is configured to store an operating system, software, programs applications, or at least a portion of the client agent 120. A further embodiment of the computing device 100 includes an installation device 116 that is used as the storage device 128.

The computing device 100 may further include a network interface 118 to interface to a LAN, WAN or the Internet through a variety of connections including, but not limited to, standard telephone lines, LAN or WAN links (e.g., 802.11, T1, T3, 56 kb, X.25), broadband connections (e.g., Integrated Services Digital Network (ISDN), Frame Relay, ATM, Gigabit Ethernet, Ethernet-over-SONET), wireless connections, or some combination of any or all of the above. Connections may also be established using a variety of communication protocols (e.g., TCP/IP, Ethernet, Attached Resource Computer Network (ARCNET), SONET, SDH, Fiber Distributed Data Interface (FDDI), RS232, RS485, IEEE 802.11, IEEE 802.11a/b/g/n, CDMA, GSM, Wi-Fi, WiMax and direct asynchronous connections). One version of the computing device 100 includes a network interface 118 able to communicate with additional computing devices via any type and/or form of gateway or tunneling protocol such as Secure Socket Layer (SSL) or Transport Layer Security (TLS). Versions of the network interface 118 may comprise any one of: a built-in network adapter; a network interface card; a Personal Computer Memory Card International Association (PCMCIA) network card; a card bus network adapter; a wireless network adapter; a USB network adapter; a modem; or any other device suitable for interfacing the computing device 100 to a network capable of communicating and performing the methods and systems described herein.

Embodiments of the computing device 100 include any one of the following I/O devices 130A-130N: a keyboard 126; a pointing device 127; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 123 may in some embodiments connect to multiple I/O devices 103A-130N to control the one or more I/O devices. Some embodiments of the I/O devices 130A-130N may be configured to provide storage or an installation device 116, while others may provide a USB interface for receiving USB storage devices. Still other embodiments include an I/O device 130 that may be a bridge between the system bus 150 and an external communication bus, such as: a USB bus; an RS-232 serial connection; a Small Computer System Interface (SCSI) bus; an IEEE 1394 bus; an Ethernet bus; a Gigabit Ethernet bus; an ATM bus; a High Performance Parallel Interface (HIPPI) bus; a Super HIPPI bus; a SerialPlus bus; a Scalable Coherent Interface (SCI) bus; a FibreChannel bus; or a Serial Attached SCSI (SAS) bus.

In some embodiments, the computing machine 100 may connect to multiple display devices 124A-124N, in other embodiments the computing device 100 may connect to a single display device 124, while in still other embodiments the computing device 100 connects to display devices 124A-124N that are the same type or form of display, or to display devices that are different types or forms. Embodiments of the display devices 124A-124N may be supported and enabled by the following: one or multiple I/O devices 130A-130N; the I/O controller 123; a combination of I/O device(s) 130A-130N and the I/O controller 123; any combination of hardware and software able to support a display device 124A-124N; any type and/or form of video adapter, video card, driver, and/or library to interface, communicate, connect or otherwise use the display devices 124A-124N. The computing device 100 may in some embodiments be configured to use one or multiple display devices 124A-124N. These configurations may include: having multiple connectors to interface to multiple display devices 124A-124N; having multiple video adapters, with each video adapter connected to one or more of the display devices 124A-124N; having an operating system configured to support multiple displays 124A-124N; using circuits and software included within the computing device 100 to connect to and use multiple display devices 124A-124N; and executing software on the main computing device 100 and multiple secondary computing devices to enable the main computing device 100 to use a secondary computing device's display as a display device 124A-124N for the main computing device 100. Still other embodiments of the computing device 100 may include multiple display devices 124A-124N provided by multiple secondary computing devices and connected to the main computing device 100 via a network.

In some embodiments, the computing machine 100 may execute any operating system, while in other embodiments the computing machine 100 may execute any of the following operating systems: any embedded operating system; any real-time operating system; any remote operating system; any operating systems for mobile computing devices; or any other operating system. In still another embodiment, the computing machine 100 may execute multiple operating systems. For example, the computing machine 100 may execute a virtualization platform that may execute or manage a virtual machine executing a first operating system, while the computing machine 100 executes a second operating system different from the first operating system.

The computing machine 100 may be embodied in any one of the following computing devices: a computing workstation; a desktop computer; a laptop or notebook computer; a server; a handheld computer; a mobile telephone; a portable telecommunication device; a media playing device; a gaming system; a mobile computing device; a netbook; a digital audio player or any other type and/or form of computing, telecommunications or media device that is capable of communication and that has sufficient processor power and memory capacity to perform the methods and systems described herein. In other embodiments the computing machine 100 may be a mobile device such as any one of the following mobile devices: a cellular telephone or personal digital assistant (PDA); a smart phone; a handheld computing device; any computing device that has different processors, operating systems, and input devices consistent with the device; or any other mobile computing device capable of performing the methods and systems described herein. In one embodiment, the computing device 100 may be a digital audio player which functions as both a portable media player and as a mass storage device. In some embodiments, the computing device 100 may have different processors, operating systems, and input devices consistent with the device.

In some embodiments, the computing device 100 comprises a combination of devices, such as a mobile phone combined with a digital audio player or portable media player. In one of these embodiments, the computing device 100 is a combination digital audio player and mobile phone. In another of these embodiments, the computing device 100 is a smartphone. In another of these embodiments, the computing device 100 is a tablet computer.

Although referred to generally desktop disk images, this disclosure is not limited to desktop disk images, and includes other embodiments of images such as server disk images. In some environments for centralized management of desktops, multiple client machines 102 receive copies of a single "golden master" desktop disk image. In one embodiment, a desktop disk image includes files used to execute an operating system and/or an image of an operating system. In another embodiment, the desktop disk image may include a set of applications and customizations. In still another embodiment, the desktop disk image represents a working environment for a user. In yet another embodiment, a desktop disk image may also be referred to as a machine disk image. In some embodiments, a copy of the master desktop disk image provided to a user by a client machine 102 may evolve with time, diverging further from the master desktop disk image as each user applies changes to their working environment. For example, changes resulting from modifying settings, adding or deleting information, and installing new applications may result in differences between one copy and another and between one copy and the master desktop disk image.

Figure 4:
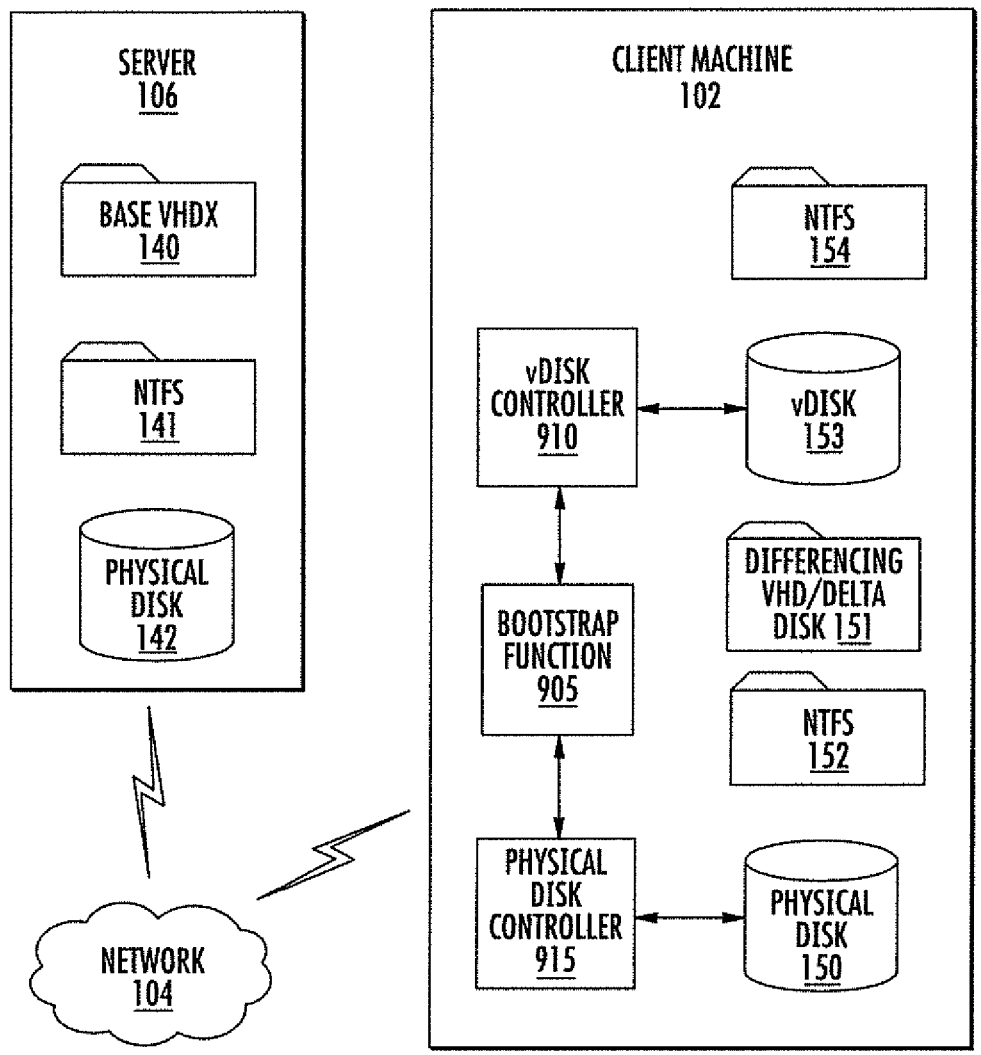
FIG. 4 illustrates a block diagram depicting an embodiment of a system for implementing, on a client, a provisioned machine persistent across the client machine reboot
Figure 5:
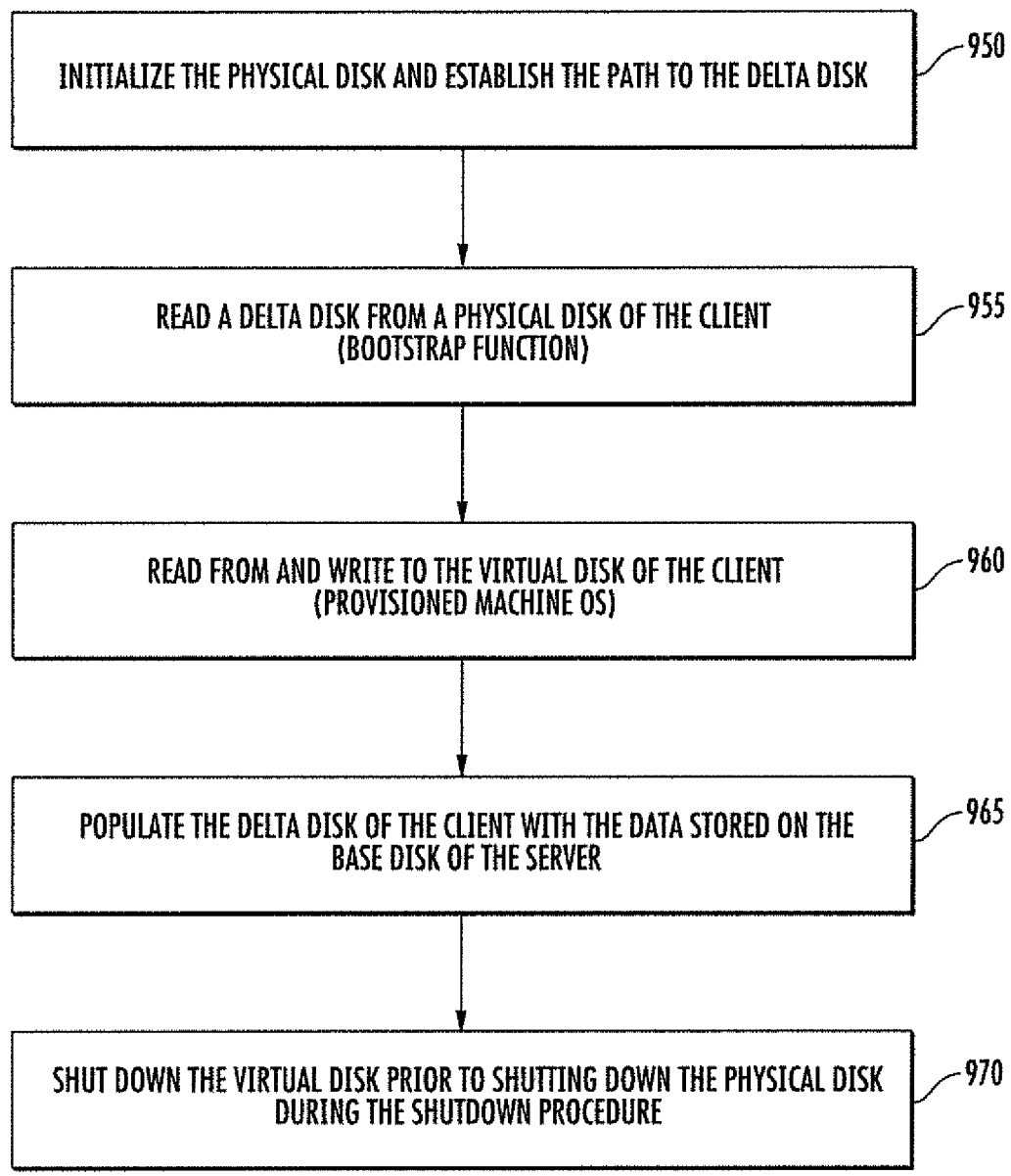
FIG. 5 illustrates a process flow for implementing, on a client, a provisioned machine persistent across the client machine reboot.

Referring now additionally to FIGS. 4-5, example systems and methods for implementing a provisioned virtual machine on a client are now described. More particularly, an approach is now described for implementing a provisioned machine on a client device, where the provisioned machine is able to execute in an offline fashion while being disconnected from a base disk of the provisioning server. The provisioned machine may also operate from a local delta disk that persists on the client machine across the boots of the client system. The systems and methods described herein also relate to persisting a delta disk from which a provisioned machine on the client machine operates across a re-boot of the client machine.

A provisioned machine may involve any number of client devices accessing and using the same base disk of a provisioning server across a network. In order for each of the provisioned machines on the clients to execute, each client machine may include a local delta disk residing on a physical disk used by the provisioned machine. However, in a typical system the client delta disk is normally incapable of persisting across reboot of the client machine. The present disclosure addresses this issue, enabling the delta disk used by the provisioned machine to persist when the client machine is rebooted or restarted.

During a preboot of the client machine, a provisioning bootstrap function for prebooting the provisioning machine may read the virtual hard disk (VHD) format differencing disk as a file located on a file system of the physical disk, such as a file located on a new technology file system (NTFS). The bootstrap function may execute in an operating mode of a CPU, such as for example an x86 real-mode. One or more VHD and NTFS stacks may be implemented with the real mode environment enabling the client machine control of the prebooting of the provisioned machine as the client machine boots.

During the boot of the client's operating system, such as the Windows OS, a virtual disk storage controller may enable the physical disk controller of the client to initialize the physical disk first so that the delta disk path chain can be established during the boot time. Initializing the physical disk to establish the delta disk path and enable the provisioned operating system to read from or write to the virtual disk that includes the disk delta. As the user on the client utilizes the functions and/or applications of the provisioned machine, the provisioned machine may operate from the virtual disk which may be composed/combined from disk delta and the base disk on the remote server.

Over time, as the delta disks receives the information and data from the server's base disk, the delta disk may include any functions or acquire any functionality of the server's base disk. In the background or by demand, the delta disk may identify portions of the base disk that are present on the server and absent on the client machine and receive such data from the base disk in order to establish the local copy of all the data stored on the server's base disk. The delta file may be synchronized with the base disk on provisioning server over the network via any protocol, such as the PVS built in protocol. The delta file, which may also be referred to as VHD differencing file, may be expanded to the maximum specified size of base disk in order to include additional data from the base disk. The delta file may copy data blocks from base to delta if the data does not exist in delta file. For data blocks that do not exist in base disk, delta file may be zero-filled. Eventually, the delta disk may become an identical copy of the server's base disk or acquire any essential functionality of the server's base disk enabling the delta disk to provide the client's provisioned machine to operate independent from the server's base disk.

When the user shuts down or restarts the client machine, during the OS shut down, the client machine may shut down the virtual disk before shutting down the physical disk. This order may ensure that the delta disk remains stored on the client's physical disk even once the machine is shut down. In some embodiments, an OS of the client machine, such as the Windows 7/Server 2008 R2 OS, comprises the functionality or knowledge to control and manage the interaction and/or dependency between the physical disk and the virtual disk of the client machine. As the provisioned machine may transmit to the client's OS the information about the virtual disk, the OS of the client may use this information to ensure that the virtual disk is stored and shut down properly so that the information from the virtual disk is not lost during the course of shut down or reboot.

Once the disk delta of the provisioned machine is capable to persist across reboot of the client machine, a synchronized virtual disk back-fill may take place to populate, at a storage block level, from the server base disk blocks of data that are not present in current VHDX differencing disk. Functionality for ensuring that the populated information is not stale may be implemented to ensure that the delta disk is populated with most updated information of the base disk.

Using the techniques described herein, the present disclosure achieves the persistence of the disk delta of the provisioned machine on the client device as well as the capability to allow such provisioned machine to run in an offline fashion by executing the applications and functions of the provisioned machine from the delta disk that is populated to include all the functionalities of the base disk of the remote provisioning server.

Referring now to FIG. 4, an embodiment of an environment and a system for implementing a provisioned virtual machine on a client device is illustrated. In brief overview, a server 106 communicates with a remote client machine 102 via a network 104, such as an intranet or a World Wide Web. Server 106 may comprise a base virtual hard disk (VHD) 140 for servicing any number provisioned machines, virtual or physical, of any number of clients 102 on the network 104. Thus, in one embodiment, VHD is streamed to any number of physical machines and any number of virtual machines. The base VHD of the server 106 may comprise information and data used by the provisioned virtual machines of the clients 102 to run applications or functions on, or via, the client's provisioned machine environment. The base VHD 140 may execute on the NTFS file system 141 of the physical disk 142 of the server 106. Client 102 may have a physical disk 150 that stores a differencing VHDX 151, also referred to as a delta disk, which may execute on the NTFS file system 152 of the client's physical disk. The delta disk may include a virtual disk 153, also referred to as a vDisk, which may also include a NTFS file system 154 of its own. The NTFS 154 of the vDisk 153 from the delta disk 151 may provide the environment within which the user of the client 102 executes the applications and services that may also be provided by the base VHD 140 of the server 106.

The NTFS, or the NTFS layer may comprise any file system or an organized collection of data, data architecture or a database used by any operating system described herein. The NTFS may operate on any network device, including a client 102 or a server 106. The NTFS may comprise or include a functionality of any software, hardware or a combination of software and hardware, programs, executables, functions, instructions, data or libraries. The NTFS may operate on a physical disk or on a virtual disk or a vDisk. The NTFS layer may provide a system of storing data and files on the hard disks or memory of any device described herein. The NTFS may be a hierarchical or a non-hierarchical file system and may be configured to operate on any operating system (OS) referenced herein. In one embodiment, NTFS layer corresponds to the NTFS file system format used by a Windows operating system. In other embodiments, the NTFS may include or comprise the functionality of any other file system for any other OS. The NTFS may be or include the functionality of a file allocation table (FAT) filing system, including the FAT 32 or FAT 64, a Hierarchical File System, any filing system for organizing data for a Mac OS or Mac OS extended. The NTFS may comprise an environment within which applications or services execute or operate. The NTFS may also include any functionality enabling an operating system of a physical machine or a virtual machine, to execute functions or applications used by the user.

A base VHD, or a base disk of the server 106, in addition to any aforementioned base disk of a server, may also include any portion of a physical disk of a server 106 disk from which a base disk image 180 may be made. The base disk of a server 106 may comprise a virtual disk located on the NTFS of the physical disk of a server 106. The base disk may comprise or include a functionality of any software, hardware or a combination of software and hardware, programs, executables, functions, instructions, data or libraries. The base disk may include files, programs, instructions, applications or procedures needed or used to operate any application or a service. The base disk may comprise any functionality to enable the operation of a provisioned machine executing on a client 102. Base disk image 180 may comprise an identical copy of the whole base disk or any portion of the base disk. The base disk may comprise any functionality of a base disk image 180 discussed above. In addition, the base VHD may include a base disk image 180 to be used by any number of clients 102 or any number of base disk images 180 for usage by any number of clients. A base disk VHD may comprise any additional environment, functions or data for implementing any of the functions, services or applications used by the client 102, including the applications, services or functions described herein. A base disk VHD may also include a functionality, programs or features for transmitting to a vDisk of a client 102 any data, blocks of data or portions of the base disk in order to populate the vDisk of the client 102 with data or information stored in the base disk.

A bootstrap function 905 may comprise any type and form of a function, program or a procedure for controlling or managing a pre-booting process or booting process for starting up the client machine 102. Bootstrap function 905 may also comprise any type and form of a function, program or a procedure for controlling or managing the procedure or process of shutting down of the client machine, particularly the order of shutting down the virtual disk and the physical disk. Bootstrap function 905 may comprise any software, hardware or a combination of software and hardware, programs, functions, executables, instructions, data or libraries. Bootstrap function 905 may execute on an x86 real mode. Bootstrap function 905 may comprise the functionality for reading the differencing disk or the delta disk as a file located on the NTFS of the physical disk. Bootstrap function 905 may comprise the functionality to initiate or activate the virtual disk from delta disk. Bootstrap function 905 may include any booting application, boot-up or boot function or procedure described herein. In addition, bootstrap function 905 may comprise a program for activating programs controlling and managing the operation of the client machine 102. Bootstrap function 905 may comprise a program, such as a BIOS, that initializes and tests basic requirements of hardware, memory or other subcomponents and devices of the client 102. Bootstrap function 905 may comprise a functionality for initializing and loading an operating system of a client 102, including the operating system of a physical device and the operating system of a virtual disk of the client 102. Bootstrap function 905 may comprise the functionality for identifying a delta disk on of the client 102 during the boot-up of the client 102. Bootstrap function 905 may include the functionality for initializing the delta disk and/or starting up the virtual disk during the boot up of the client 102.

Virtual disk controller 910 may include any type and form of a function or controller for controlling or managing the virtual disk of the client 102. Virtual disk controller 910 may comprise any software, hardware or a combination of software and hardware, programs, functions, executables, instructions, data or libraries. Virtual disk controller 910 may include any functionality for starting up the virtual disk or shutting down the virtual disk. Virtual disk controller 910 may start up the vDisk during the boot up of the client 102 and may shut down the vDisk during the shutdown of the client 102. Virtual disk controller 910 may include any functionality for operating responsive to commands or instructions of the bootstrap function 905. For example, virtual disk controller 910 may initiate and set up the vDisk of the delta disk of the client 102 responsive to an instruction from the bootstrap function 905 during the start up or boot up of the client 102. Similarly, virtual disk controller 910 may shut down the virtual disk during the shutdown of the client 102 in response to an instruction from the bootstrap function 905.

Virtual disk controller 910 may also include the functionality for determining data or portions of data that are present at the base disk of the server 106 and not present at the delta disk of the client 102 and acquiring such data from the base disk of the server 106. Virtual disk controller 910 may comprise the functionality to request from the base disk blocks of data not present on the delta disk and populate the delta disk with the data received. Virtual disk controller 910 may comprise the functionality for establishing a background connection with the base disk of the server 106 and keep synchronizing the delta disk with the base disk until the delta disk includes all the data of the base disk of the server 106.

Physical disk controller 915 may include any type and form of a function or controller for controlling or managing the physical disk of the client 102. Physical disk controller 915 may comprise any software, hardware or a combination of software and hardware, programs, functions, executables, instructions, data or libraries. Physical disk controller 915 may include any functionality for starting up the physical disk or shutting down the physical disk. Physical disk controller 915 may start up the physical disk during the boot up of the client 102 and may shut down the physical disk during the shutdown of the client 102. Physical disk controller 915 may include any functionality for operating responsive to commands or instructions of the bootstrap function 905. For example, physical disk controller 915 may initiate and set up the physical of the delta disk of the client 102 responsive to an instruction from the bootstrap function 905 during the start up or boot up of the client 102. Similarly, physical disk controller 915 may shut down the physical disk during the shutdown of the client 102 in response to an instruction from the bootstrap function 905.

Referring now to FIG. 5, an embodiment of a method for implementing a provisioned machine on a client device is illustrated. In brief overview, at step 950, a bootstrap function initializes a physical disk and establishes the path to a delta disk. At step 955, the bootstrap function reads the delta disk from the physical disk. At step 960, the operating system of the provisioned machine reads from and writes to the virtual disk of the client as the user operates on the provisioned machine. At step 965, the virtual disk controller populates the delta disk of the client with the data stored on the base disk of the server. At step 970, the bootstrap function ensures that during the shutdown of the client machine, the virtual disk is shut down prior to the shutting down of the physical disk.

At step 950, during the boot up of the operating system of the client, the bootstrap function initializes the physical disk and establishes the path to the delta disk. In some embodiments, the initialization of the physical disk and establishment of the path to the delta disk occur before the boot up of the client machine begins, such as in pre boot, for example. In some embodiments, the bootstrap function establishes the path to the virtual disk on the delta disk during the boot up of the client machine. The bootstrap function may pause or delay the start up or boot up of the operating system to ensure that the path chain to the delta disk or the virtual disk is established. The bootstrap function may establish the path to the delta disk by allowing the physical disk to start up in order to read the delta disk from the physical disk. The delta disk created on the client machine prior to the previous shut down of the client may persist responsive to the initialization of the physical disk and establishment of the path to the delta disk during the boot up of the client machine.

At step 955, a bootstrap function identifies, initiates or reads a delta disk from a physical disk of the client machine. The bootstrap function may identify, initiate or read a delta disk from the physical disk during a pre-boot of the client machine. In some embodiments, the bootstrap function identifies, initiates or reads the delta disk during the boot up of the client machine. In further embodiments, the bootstrap function identifies, initiates or reads the delta disk upon initializing the physical disk and establishing the path to the disk at step 950. In some embodiments, the bootstrap function initiates another function or a program to identify, initiate or read the delta disk. The bootstrap function may pause or delay the boot up of the client machine to ensure that the delta disk or the virtual disk is read or identified. The bootstrap function may read the delta disk as a file located on the NTFS file system of the client machine. In some embodiments, the bootstrap function reads the delta disk as a function or an executable program to initiate or execute. Bootstrap function may implement the VHD and NTFS stacks of the virtual disk in the x86 real mode.

At step 960, the provisioned machine operating system reads from and writes to the virtual disk of the client. The operating system of the provisioned machine as well as any other application operating within the provisioned machine or the client may write to the virtual disk. The virtual disk of the delta disk may be written to or modified during the operation of the client machine. While the client machine is powered up, the provisioned machine may execute the functions from or store data to the virtual disk. A user of the client may use the functions or data from the delta disk as well as the data or functions stored on the remote base disk to operate or execute applications, services or processes.

At step 965, the virtual disk controller may populate the delta disk of the client with data or information stored on the base disk of the remote server 106. In some embodiments, the virtual disk controller determines or identifies that a portion of data is present on the base disk of the remote server and not present on the delta disk of the client. The virtual disk may establish a background connection to transfer the identified portion of data onto the delta disk. The virtual disk controller may continue synchronizing or populating the delta disk with data from the base disk until the delta disk includes all the data or information stored on the base disk. The virtual disk controller may expand the delta disk as necessary in order to include all the data of the base disk. In some embodiments, the virtual disk overwrites a portion of the delta disk with zeros or ones. Once a delta disk includes all the data from the base disk or at least a sufficient amount of data from the base disk enabling the user to rely solely on the delta disk, the provisioned machine may operate from the delta disk even if the client is off line. In some embodiments, the client is disconnected from the server hosting the base disk and the client operates the provisioned machine from the virtual disk or the delta disk stored on the physical disk of the client machine.

At step 970, the client machine shuts down the virtual disk prior to shutting down the physical disk during the shutdown of the client machine. In some embodiments, the virtual disk driver of the Windows OS shuts down the virtual disk prior to the shutdown of the physical disk during the shutdown of the client machine. In other embodiments, a function, such as the bootstrap function, shuts down the virtual disk or initiates shutting down of the virtual disk prior to shutting down the physical driver. In some embodiments, the virtual disk driver manages inter-disk dependency relations and initiates a function to shut down the virtual disk prior to shutting down the physical disk. In other embodiments, the client machine, or a function of the client machine such as the virtual disk driver, sends one or more instructions to the virtual disk controller and a physical disk controller to ensure that the virtual disk and/or the delta disk is shut down prior to the shutdown of the physical disk. The virtual disk controller may ensure that the vDisk and the delta disk are properly stored on the physical disk prior to the shutdown.

Figure 6:
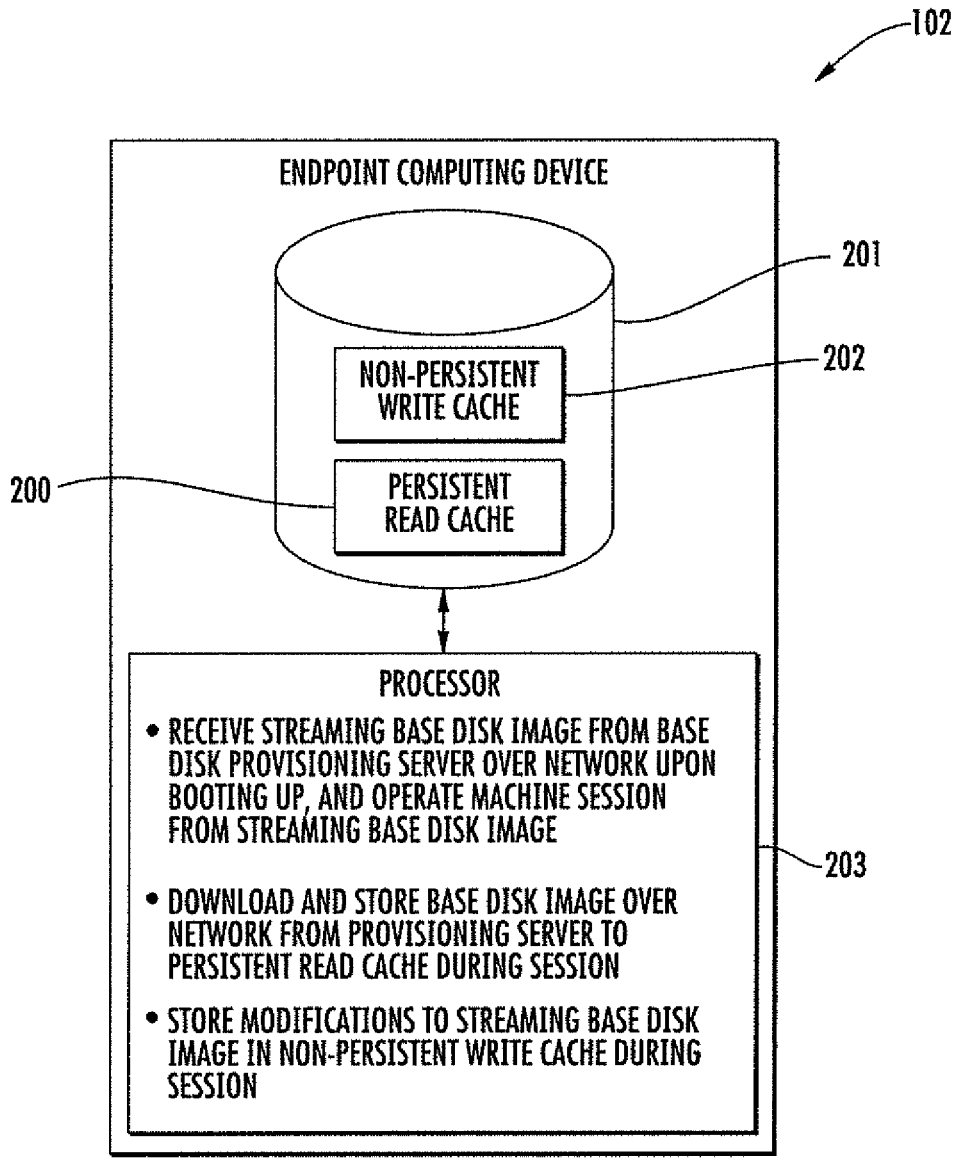
FIG. 6 is a schematic block diagram of an endpoint computing device in accordance with an example embodiment providing a persistent read cache and non-persistent write cache.

Turning now to FIG. 6, as noted above, while a typical machine streaming approach may provide "instant gratification" to an endpoint without a significant wait time, it requires that the machine maintains constant network connection. Moreover, with a typical machine image cloning approach, while the endpoint is able to perform offline computing after image deployment, this requires a relatively long down-time for the initial image transfer.

Generally speaking, the present embodiment advantageously provides a hybrid machine deployment approach by streaming a machine while synchronizing the base disk image to a persistent read cache 200 in the background to bring a client computing device or machine 102 to an offline computing capable state. More particularly, the computing device 102 illustratively includes one or more memories 201 in which the persistent read cache 200 resides, along with a non-persistent write cache 202. The computing device 102 further illustratively includes a processor 203, which may be similar to the one described above with reference to FIGS. 1-4. Moreover, other components of the client device 102 discussed above may also be included in the current embodiment, which are not shown in FIG. 6.

Figure 7A:
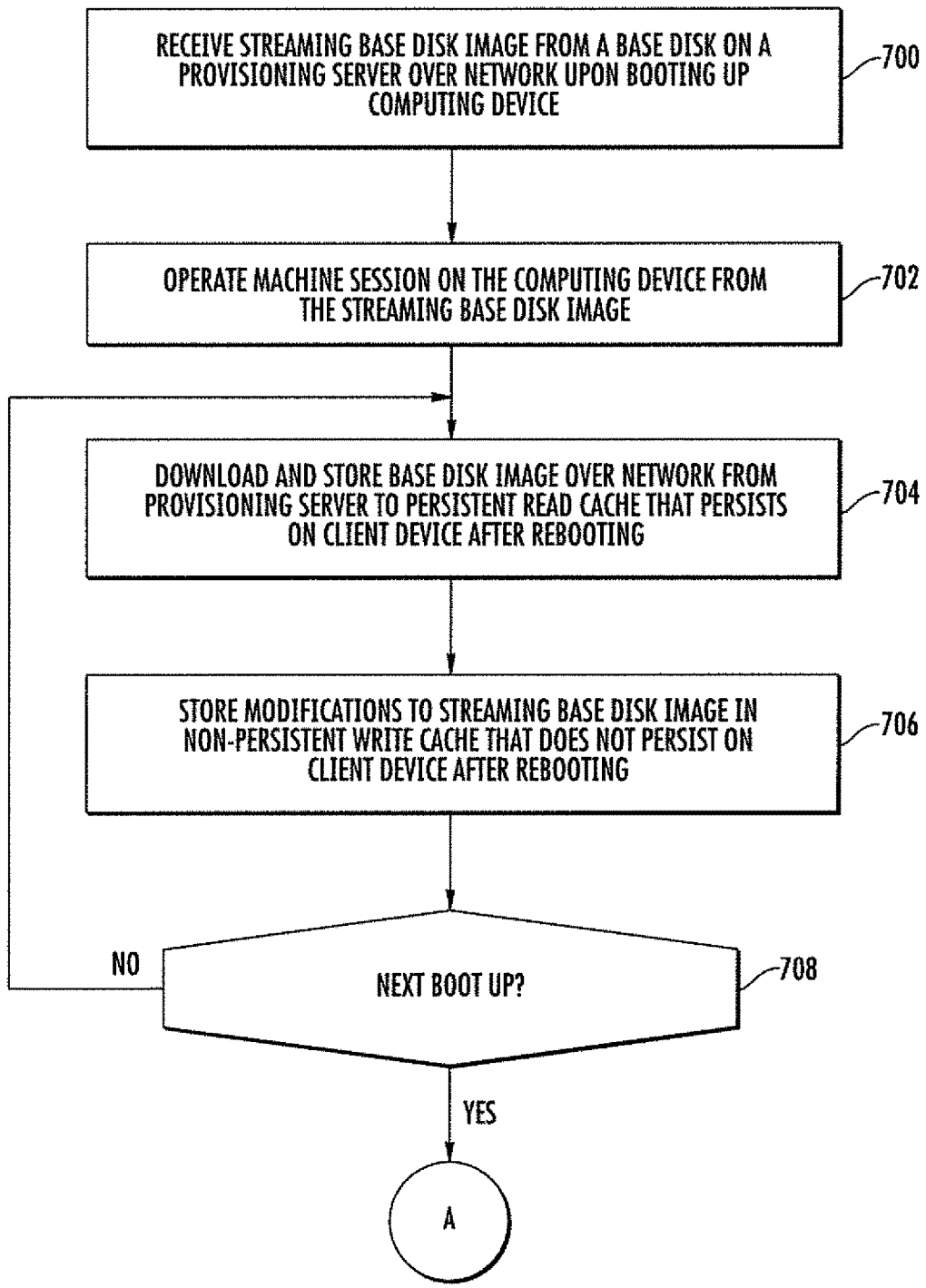
FIGS. 7A and 7B illustrate a process flow associated with the computing device of FIG. 6 in accordance with an example embodiment.
Figure 7B:
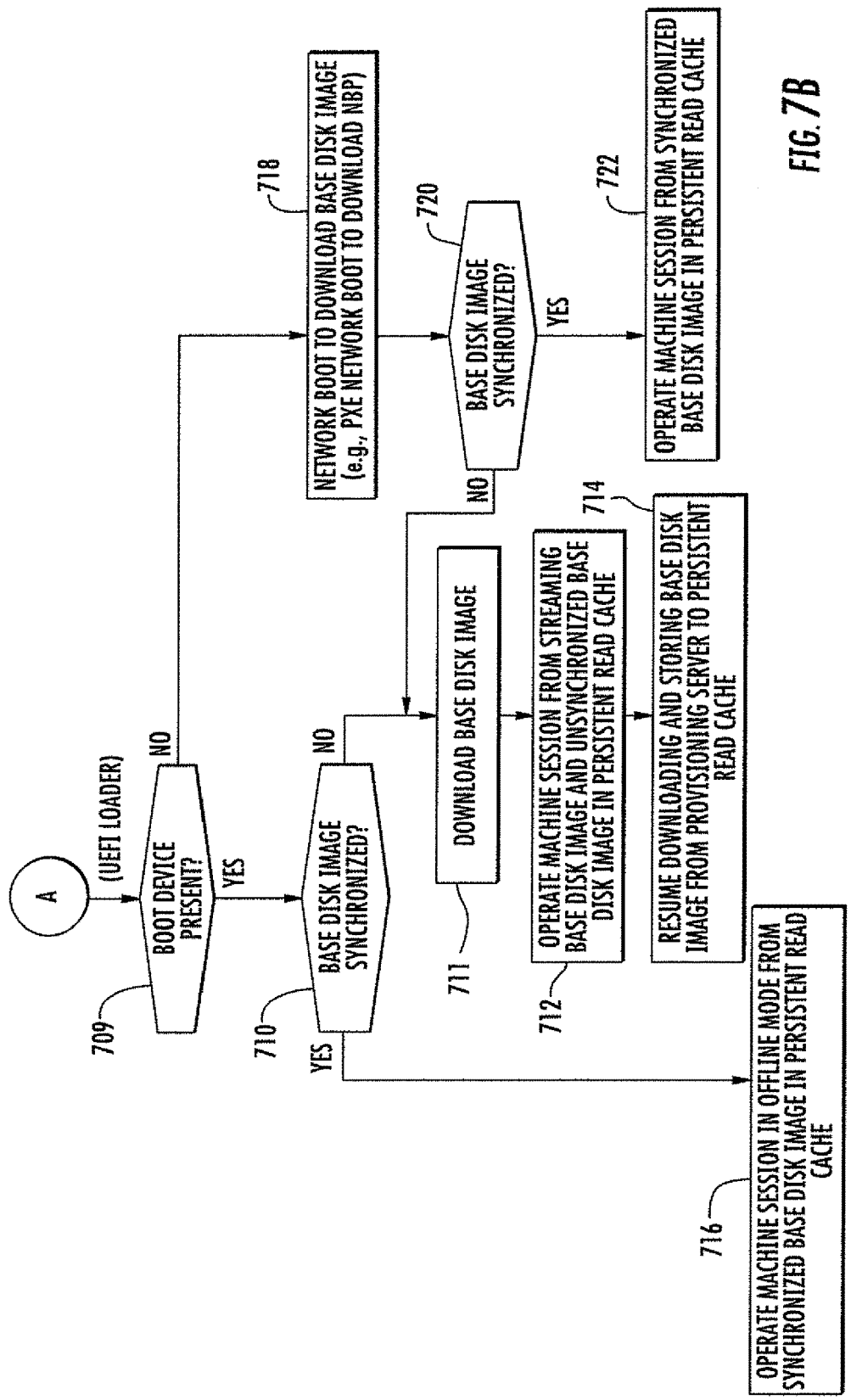

Referring additionally to FIGS. 7A and 7B, the various operations performed by the processor 203 in the present embodiment will now be described. At Block 700, the processor 203 may receive a streaming base disk image from a base disk (e.g., the base VHDX 140) on a provisioning server 106 over a network 104 upon booting up the computing device (see FIG. 4). For example, from a cold boot, the processor 203 may initiate a PXE boot to stream the base disk image (e.g., including the operating system and workload). As such, the processor 203 may accordingly operate a machine session on the computing device 102 from the streaming base disk image, at Block 702, without a long wait time to get the machine session up and running after the cold boot.

Furthermore, once the machine session is up and running on the computing device 102 from the streaming base disk image, the processor 203 further may begin to download and store the base disk image over the network 104 from the provisioning server 106 to the persistent read cache 200, at Block 704. More particularly, the persistent read cache 200 will persist on the client device 102 after rebooting so that the data stored therein may be used for a next boot up. By way of example, the persistent read cache 200 may be implemented on a hard disk or on a FLASH drive, which is not erased or overwritten when the computing device 102 is rebooted. In accordance with one example embodiment, the processor 203 may execute a background program to initially contact the streaming server 106 to determine the amount of data in the base vDisk 140, and then download and store the base disk image content and metadata in the background to the persistent read cache 200, as will be discussed further below. Once the persistent read cache 200 has been synchronized completely, then the computing device 102 advantageously becomes an offline capable machine with an additional boot device with boot instructions/parameters.

On the other hand, the processor 203 stores any modifications to the streaming base disk image during a current machine session, such as those described above, in the non-persistent write cache 202 that does not persist on the client device after rebooting, at Block 706. By way of example, the non-persistent write cache 202 may be implemented in volatile memory (e.g., RAM), although in some embodiments it may in addition (or instead) be implemented in a hard disk in a location that is either wiped at the conclusion of the machine session, or overwritten during a next machine session. By way of contrast to the delta disk approach described above with reference to FIGS. 4-5, here such data will not persist or be saved from one session to the next.

When a next boot up of the computing device 102 occurs (Block 708), the processor 203 may determine if a boot device (e.g., a flash/USB drive, CD ROM, etc.) is present (e.g., via a UEFI loader), at Block 709. By way of example, the boot device may have a UEFI boot program and/or key stored thereon in one example embodiment, although other approaches may be used in different embodiments. If the boot device is present, the processor 203 may further determine if the base disk image in the persistent read cache 200 is synchronized with the base disk 140 on the provisioning server 106, at Block 710. If not, this may be a result of the machine session ending before the complete base disk image was downloaded to the persistent read cache 200, or the base disk image having changed since the preceding boot up, for example.

In such event, the processor 203 may then receive the streaming base disk image from the base disk 140 on the provisioning server 106 for use in operating the machine session on the computing device 102, at Block 711, as described above with respect to Block 700. However, in accordance with an example embodiment, the processor 203 may also optionally leverage that portion of data in the persistent read cache 200 which is synchronized with the base disk image, and at least partially operate the machine session based upon this data where applicable, at Block 712.

In addition, the processor 203 may further resume downloading and storing the base disk image from the provisioning server 106 to the persistent read cache 200 after this next boot up, at Block 714. To this end, while the processor 203 downloads the base disk image during a machine session to the persistent read cache 200, in one example embodiment the processor 203 may maintain an internal state to keep track of the progress so that the download may resume after an interruption, e.g., after the next boot up.

On the other hand, if at the time of the next boot up the base disk image in the persistent read cache 200 is fully synchronized with the base disk 140 (e.g., all of the contents of the base disk have been stored in the persistent read cache 200 and the base disk version has not changed), and the boot device is present, the processor 203 may advantageously operate the machine session in an offline mode or state completely from the synchronized base disk image in the persistent read cache 200, at Block 716. A difference between offline mode and normal mode is that a PXE network boot is typically required for normal mode operation and is usually available only when connected to a corporate network, for example. As such, the ability to operate in the offline mode may be particularly advantageous when employees need to work from home or on the road, for example.

If the boot device is not present, then the computing device 102 may PXE network boot up, at Block 718, and then determine if the base disk image is synchronized with the base disk 40, as described above (Block 720). If it is, the machine session may be operated directly from the synchronized base disk image in the persistent read cache 200, at Block 722. In this way, the endpoint computing device 102 becomes fully tolerant to network outages, and will not be subject to an indefinite wait if problems arise with the streaming base disk image. Otherwise, the processor 203 may operate the machine session and resume downloading the base disk image as described above with reference to Blocks 712 and 714.

Figure 8:
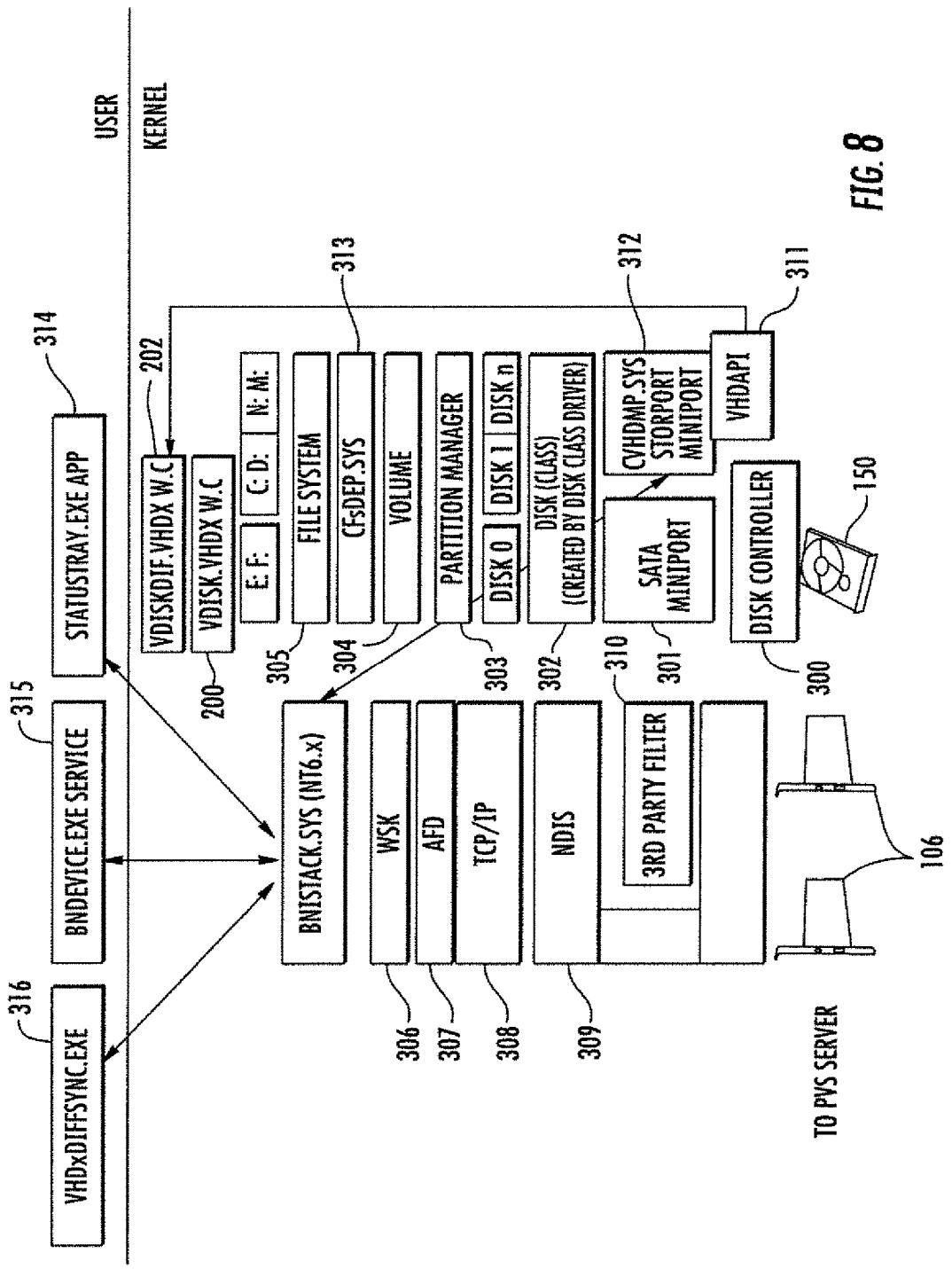
FIGS. 8 and 9 are component level diagrams for an example implementation of the computing device of FIG. 6.
Figure 9:
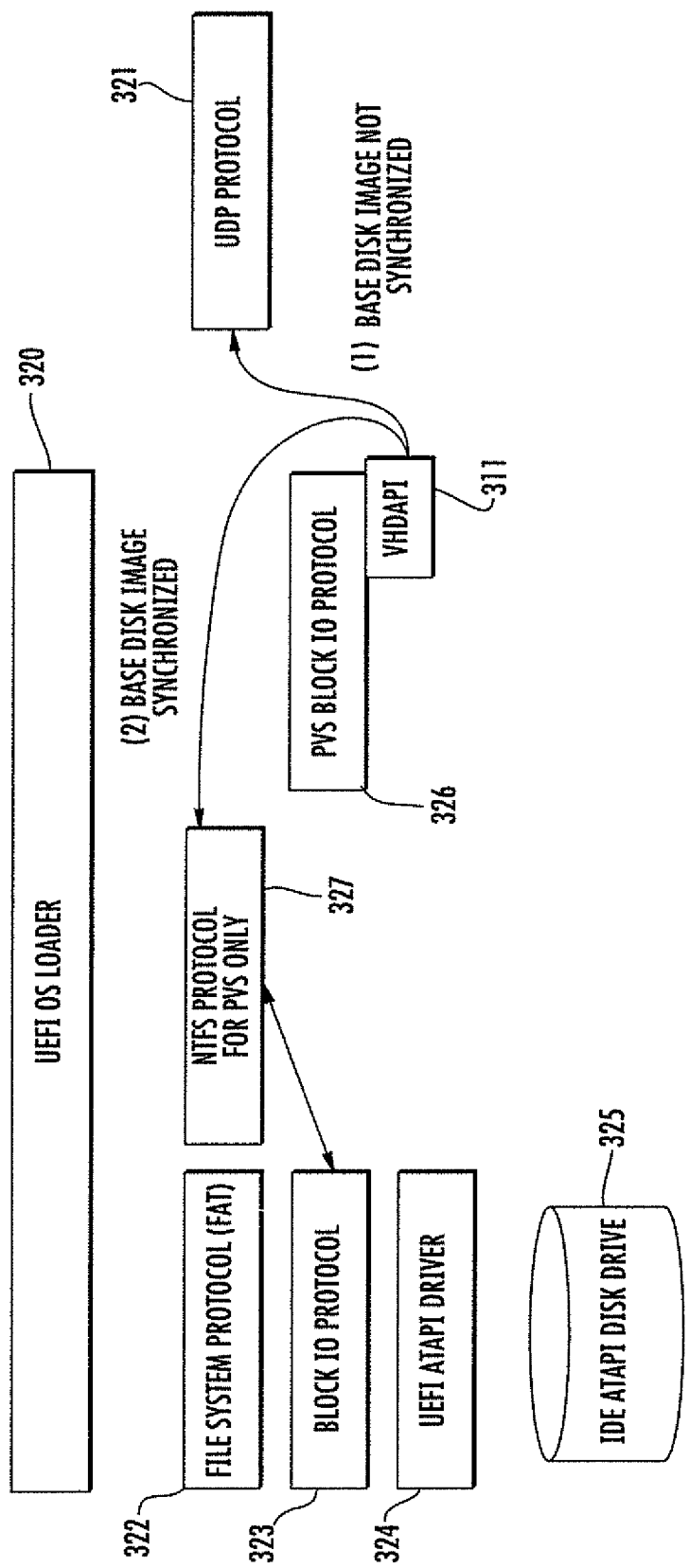

Referring now additionally to FIGS. 8 and 9, an example endpoint client device 102 implementation is now described which may be used to implement the above described read and write cache configuration. This example implementation is based upon Microsoft® Windows® operating system components, as well as Citrix® Provisioning Services (PVS) components. More particularly, FIG. 8 provides a Windows component diagram including the following Windows components or modules at the kernel level: disk controller 300 (for a hard disk 150); Serial Advanced Technology (SATA) miniport 301; disk class 302 and associated disk (Disk 0); partition manager 303; volume 304; file system 305; WSK function 306; ancillary function drivers (AFD) 307; TCP/IP stack 308; and Network Driver Interface Specification (NDIS) API 309 and associated filters 310 to interface with PVS server(s) 106. The various PVS components or modules operating at both the kernel and user levels are: VhdApi 311; CVhdMp.sys storport miniport 312; CFsDep.sys 313; StatusTrayexe.app 314; BNDevice.exe service 315; and VhdxDiffSync.exe 316.

Moreover, FIG. 9 provides a UEFI component diagram for the endpoint computing device 102, including the following Windows components or modules: UEFI OS loader 320; User Data Protocol (UDP) 321; file system protocols (e.g., file allocation table—FAT) 322; BlockIO protocols 323; UEFI ATAPI driver 324; and IDE ATAPI disk drive 325. The associated PVS components or modules further include a PVS BlockIO protocol 326 and NTFS protocol reader 327. It should be noted that the illustrated configurations are merely exemplary, and that different configurations may be used in different embodiments (e.g., for different operating systems, etc.). For clarity of explanation, only the relevant components and operations used to implement the above-described streaming/offline endpoint features and associated components are specifically discussed herein.

When the machine operating system is up and running, the background program 316 (VhdxDiffSync.exe) contacts the streaming server to determine the amount or size of data size in the base vDisk 140, and it then starts to download the base vDisk and store its contents and metadata to the persistent read cache 200 (here designated as the file vdisk.vhdx). Once the persistent read cache 200 has been synchronized completely, then this endpoint effective becomes an offline capable machine, as described above.

When the computing device 102 reboots the next time from a boot device (e.g., local USB thumb drive with a special UEFI boot program, as discussed above), the boot program will reestablish the persistent vDisk from read cache file vdisk.vhdx and publish vDisk metadata into a firmware ACPI table. This allows the UEFI OS loader 320 to boot the operating system from previously synchronized read cache vDisk. Once the operating system loader has loaded all boot drivers, the Citrix® streaming virtual disk driver retrieves vDisk metadata from the ACPI table to skip the typical PXE boot network handshake protocols. Now this endpoint may operate in an offline state completely.

The program VhdApi 311 receives incoming read IO from the UEFI OS loader 320 and inspects the IO offset/length to determine if the data is within the read cache 200, or still on the provisioning server 106. In a first case (1) where the base disk image is not synchronized, VhdApi 311 invokes the UDP protocol 321 to begin downloading the base disk image from the server 106. In a second case (2) where the base disk image is synchronized, VhdApi 311 accordingly invokes the NTFS protocol 327 (see FIG. 9). The NTFS reader 327 and VhdApi 311 may be ported into UEFI to establish persistent storage of the read cache 200 (vdisk.vhdx) for the UEFI boot service. The NTFS reader 327 uses the BlockIO protocol 323 to find the read cache data within the read cache file (vdisk.vhdx) on the NTFS file system.

In addition to the base vDisk 140 being transferred to the read cache 200 at the endpoint, in one example embodiment, a device personality (e.g., machine name, machine AD account, etc.) may also be saved in the read cache for use as an offline endpoint to re-apply the personality setting after reboot. The read cache 200 may be used throughout offline computing until a next PXE boot to streaming network occurs, where the endpoint will revalidate the vDisk assignment and version against the local read cache 200 to tie back to provisioning management. If the vDisk has no change, it may only re-sync the endpoint personality (e.g., AD account expiration). If the vDisk has changed, the endpoint may discard the read cache 200 and start all over again in accordance with one example implementation.

In one example configuration, an optional VHDX Data-Run metadata generator may be used. Its function may be to describe each consecutive VHDX contiguous data chunk in a link list structure. This may allow the endpoint to only download valid data chunks and skip zero data to minimize download time.

It will be appreciated that the above-described approach may advantageously transform a streaming endpoint via a network boot to a fully offline endpoint, and keep the endpoint in managed state for a future versioning update. This approach may not only benefit from both instantaneous network boot, but also enhanced performance from offline computing. By way of example, this approach may be advantageous for applications such as call centers, where users need access to a computing device for a session, but others may use the same computing device during different sessions. As such, it may be desirable not to save any user changes to the base disk made by any given user. However, the above-described approach may be used in other applications as well.

Further details on machine provisioning systems may be found in U.S. Pat. No. 9,176,744 to Lee, which is assigned to the present assignee Citrix Systems, Inc., and is hereby incorporate herein in its entirety by reference.

It should be noted that the methods and systems described herein may be implemented in hardware, programmable devices, firmware, software or a combination thereof. The methods and systems described herein or parts of the methods and systems described herein may also be embodied in executable instructions stored in a non-transitory computer-readable storage medium or machine-readable medium such as a magnetic (e.g., hard drive, floppy drive), optical (e.g., compact disk, digital versatile disk, etc.), or semiconductor storage medium (e.g., volatile, non-volatile).

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

That which is claimed is:

1. A computing device comprising:
at least one memory and a processor cooperating therewith to
receive a streaming base disk image from a base disk on a provisioning server over a network upon booting up the computing device, and operate a machine session on the computing device from the streaming base disk image, and
while the machine session operates on the computing device from the streaming base disk image,
download and store the base disk image over the network from the provisioning server to a persistent read cache in the at least one memory that persists on the client device after rebooting, and
store modifications to the streaming base disk image in a non-persistent write cache in the at least one memory that does not persist on the client device after rebooting;
wherein during a next boot up of the computing device the processor determines whether the base disk image in the persistent read cache is synchronized with the base disk on the provisioning server, and when the base disk image in the persistent read cache is not synchronized with the base disk on the provisioning server the processor receives the streaming base disk image from the base disk on the provisioning server and operates the machine session from both the streaming base disk image and the unsynchronized base disk image in the persistent read cache.

2. The computing device of claim 1 wherein after the next boot up, when the base disk image in the persistent read cache is synchronized with the base disk on the provisioning server, the processor operates the machine session from the synchronized base disk image in the persistent read cache.

3. The computing device of claim 1 wherein the processor further resumes downloading and storing the base disk image from the provisioning server to the persistent read cache after the next boot up.

4. The computing device of claim 1 wherein after the next boot up, when the base disk image in the persistent read cache is synchronized with the base disk on the provisioning server, the processor operates the machine session in an offline mode from the synchronized base disk image in the persistent read cache based upon detecting a boot device.

5. The computing device of claim 1 wherein the processor downloads and stores the base disk image to the persistent read cache in the background while the machine session operates on the computing device.

6. The computing device of claim 1 wherein the processor is further configured to determine a size of the base disk on the provisioning server before downloading and storing the base disk image to the persistent read cache.

7. The computing device of claim 1 wherein the at least one memory comprises a hard disk and a random access memory (RAM); and wherein the persistent read cache is in the hard disk, and the non-persistent write cache is in at least one of the RAM and the hard disk.

8. A method for using a computing device comprising:
receiving a streaming base disk image from a base disk on a provisioning server over a network upon booting up the computing device, and operating a machine session on the computing device from the streaming base disk image;
while the machine session operates on the computing device from the streaming base disk image,
downloading and storing the base disk image over the network from the provisioning server to a persistent read cache that persists on the client device after rebooting, and
storing modifications to the streaming base disk image in a non-persistent write cache that does not persist on the client device after rebooting;
determining, during a next boot up of the computing device, whether the base disk image in the persistent read cache is synchronized with the base disk on the provisioning server; and
when the base disk image in the persistent read cache is not synchronized with the base disk on the provisioning server, receiving the streaming base disk image from the base disk on the provisioning server and operating the machine session from both the streaming base disk image and the unsynchronized base disk image in the persistent read cache.

9. The method of claim 8 further comprising after the next boot up, when the base disk image in the persistent read cache is synchronized with the base disk on the provisioning server, operating the machine session from the synchronized base disk image in the persistent read cache.

10. The method of claim 8 further comprising resuming downloading and storing the base disk image from the provisioning server to the persistent read cache after the next boot up.

11. The method of claim 8 further comprising after the next boot up, when the base disk image in the persistent read cache is synchronized with the base disk on the provisioning server, operating the machine session in an offline mode from the synchronized base disk image in the persistent read cache based upon detecting a boot device.

12. A non-transitory computer-readable medium having computer-executable instructions for causing a computing device to perform steps comprising:
receiving a streaming base disk image from a base disk on a provisioning server over a network upon booting up the computing device, and operating a machine session on the computing device from the streaming base disk image; and
while the machine session operates on the computing device from the streaming base disk image,
downloading and storing the base disk image over the network from the provisioning server to a persistent read cache that persists on the client device after rebooting, and
storing modifications to the streaming base disk image in a non-persistent write cache that does not persist on the client device after rebooting;
determining, during a next boot up of the computing device, whether the base disk image in the persistent read cache is synchronized with the base disk on the provisioning server; and
when the base disk image in the persistent read cache is not synchronized with the base disk on the provisioning server, receiving the streaming base disk image from the base disk on the provisioning server and operating the machine session from both the streaming base disk image and the unsynchronized base disk image in the persistent read cache.

13. The non-transitory computer-readable medium of claim 12 further having computer-executable instructions for causing the computing device to, after the next boot up, when the base disk image in the persistent read cache is synchronized with the base disk on the provisioning server, operate the machine session from the synchronized base disk image in the persistent read cache.

14. The non-transitory computer-readable medium of claim 12 further having computer-executable instructions for causing the computing device to resume downloading and storing the base disk image from the provisioning server to the persistent read cache after the next boot up.

15. The non-transitory computer-readable medium of claim 12 further having computer-executable instructions for causing the computing device to, after the next boot up, when the base disk image in the persistent read cache is synchronized with the base disk on the provisioning server, operate the machine session in an offline mode from the synchronized base disk image in the persistent read cache based upon detecting a boot device.

* * * * *